US006925034B2

United States Patent
Coffin et al.

(10) Patent No.: US 6,925,034 B2
(45) Date of Patent: Aug. 2, 2005

(54) APPARATUS FOR REGULATING THE POSITION OF A PLUNGE MECHANISM OF A CARTRIDGE ENGAGING ASSEMBLY

(75) Inventors: Paul C Coffin, Fort Collins, CO (US); Richard Lynn Gardner, Jr., Greeley, CO (US)

(73) Assignee: Hewlett-Packard Development Company, L.P.

(*) Notice: Subject to any disclaimer, the term of this patent is extended or adjusted under 35 U.S.C. 154(b) by 31 days.

(21) Appl. No.: 10/640,219

(22) Filed: Aug. 12, 2003

(65) Prior Publication Data

US 2004/0032802 A1 Feb. 19, 2004

Related U.S. Application Data

(63) Continuation of application No. 09/799,316, filed on Mar. 5, 2001, now Pat. No. 6,661,748.

(51) Int. Cl.[7] .............................................. G11B 21/08
(52) U.S. Cl. ................................ 369/30.29; 369/34.01
(58) Field of Search ........................ 360/92; 369/30.29, 369/34.01, 30.31, 30.27, 30.28, 30.32, 33.01; 414/273, 275; 700/218, 214, 215, 259, 258

(56) References Cited

U.S. PATENT DOCUMENTS

| | | | |
|---|---|---|---|
| 4,807,208 A | * | 2/1989 | Geiger ..................... 369/30.89 |
| 5,099,465 A | * | 3/1992 | Geiger et al. ............ 369/30.34 |
| 5,237,467 A | | 8/1993 | Marlowe |
| 5,596,556 A | | 1/1997 | Luffel et al. |
| 6,025,972 A | | 2/2000 | Schmidtke et al. |
| 6,104,693 A | | 8/2000 | Coffin et al. |
| 6,144,521 A | * | 11/2000 | Egan et al. ................... 360/92 |
| 6,160,786 A | | 12/2000 | Coffin et al. |
| 6,185,165 B1 | * | 2/2001 | Jesionowski et al. ..... 369/30.34 |
| 6,205,093 B1 | * | 3/2001 | Abbott et al. ............. 369/30.31 |
| 6,246,642 B1 | * | 6/2001 | Gardner et al. .......... 369/30.42 |
| 6,301,072 B1 | | 10/2001 | Coffin et al. |
| 6,473,706 B1 | * | 10/2002 | Gallo et al. .............. 369/30.31 |
| 6,618,348 B1 | * | 9/2003 | Coffin et al. ........... 369/178.01 |
| 6,693,858 B2 | * | 2/2004 | Reasoner et al. ........ 369/30.29 |

FOREIGN PATENT DOCUMENTS

EP        0391569 A2     10/1990

* cited by examiner

*Primary Examiner*—Tan Dinh

(57) ABSTRACT

Apparatus for controlling the position of a plunge mechanism which is mounted to a cartridge engaging assembly is disclosed herein. The apparatus may be embodied in a cartridge engaging assembly having a plunge mechanism that is moveable between a retracted position and an extended position. The plunge mechanism is provided with a reference mark that moves with the plunge mechanism. A detector is mounted to the cartridge engaging assembly, wherein the detector senses an image of the reference mark and produces an output signal related thereto. A control system is operatively associated with the detector and is responsive to the output signal produced thereby. The control system is also operatively associated with the plunge mechanism so that it regulates the position of the plunge mechanism based on the output signal.

4 Claims, 8 Drawing Sheets

APPARATUS FOR REGULATING THE POSITION OF A PLUNGE MECHANISM OF A CARTRIDGE ENGAGING ASSEMBLY

CROSS-REFERENCE TO RELATED APPLICATIONS

This is a continuation of application Ser. No. 09/799,316 filed on Mar. 5, 2001 U.S. Pat. No. 6,661,748, which is hereby incorporated by reference herein.

FIELD OF THE INVENTION

The invention pertains to the field of cartridge engaging assemblies (i.e., "pickers") of the type used in multiple cartridge data storage systems, and more specifically, to a method and apparatus for controlling the position of a plunge mechanism which is mounted to a cartridge engaging assembly.

BACKGROUND OF THE INVENTION

There are many types of data storage systems available today. Some of these systems store data cartridges at known locations, and retrieve desired data cartridges from the known locations so that data may be written to or read from the data cartridges. Such data storage systems are often referred to as "juke box" data storage systems, particularly if they can accommodate a large number of data cartridges.

A typical juke box data storage system may include one or more different types of cartridge receiving devices for holding the various data cartridges. For example, one type of cartridge receiving device may comprise a cartridge storage rack or "magazine", while another type of cartridge receiving device may comprise a cartridge read/write device or "drive". The cartridge storage racks or magazines serve to provide storage locations for the data cartridges and are often arranged so that they form one or more vertical stacks, although other configurations are possible. The cartridge read/write device may be located at any convenient location within the data storage system.

The data storage system may also be provided with a movable cartridge engaging assembly or "picker" for transporting the data cartridges between the various cartridge receiving devices (e.g., between the cartridge storage racks and the cartridge read/write devices). A typical cartridge engaging assembly may also be provided with a plunge mechanism or "thumb assembly" for engaging the various data cartridges contained in the cartridge receiving devices and for drawing them into the cartridge engaging assembly. A positioning system associated with the cartridge engaging assembly may be used to move the cartridge engaging assembly between the various cartridge receiving devices.

Data storage systems of the type described above are usually connected to a host computer system which may be used to access or store data on the data cartridges. For example, if the host computer system issues a request for data contained on a particular data cartridge, a control system associated with the data storage system will actuate the positioning system to move the cartridge engaging assembly along the cartridge storage racks until the cartridge engaging assembly is positioned adjacent the desired data cartridge. The plunge mechanism associated with the cartridge engaging assembly may then extend to remove the data cartridge from its cartridge storage rack, and then retract to draw the cartridge into the cartridge engaging assembly. The positioning system may then be actuated to move the cartridge engaging assembly to an appropriate cartridge read/write device. Once properly positioned adjacent the cartridge read/write device, the plunge mechanism may extend to insert the selected data cartridge into the cartridge read/write device so that the host computer may thereafter read data from or write data to the data cartridge. After the read/write operation is complete, the plunge mechanism may be actuated to remove the data cartridge from the cartridge read/write device. The cartridge engaging assembly may thereafter return the data cartridge to its cartridge storage rack.

A typical plunge mechanism is usually slidably mounted to the cartridge engaging assembly and is provided with a drive system so that the plunge mechanism may be moved toward and away from a cartridge access end of the cartridge engaging assembly (i.e., to an extended or retracted position). For example, if it is desired to retrieve a data cartridge from a cartridge receiving device, the drive system moves the plunge mechanism toward the cartridge access end of the cartridge engaging assembly so that the plunge mechanism may engage (or grab) the data cartridge. The drive system then retracts the plunge mechanism and pulls the engaged data cartridge into the cartridge engaging assembly. If it is desired to load the data cartridge into the cartridge receiving device, the drive system then moves the plunge mechanism and data cartridge toward the cartridge access end of the cartridge engaging assembly, thus inserting the data cartridge into the cartridge receiving device.

Typically, the position of the plunge mechanism must be controlled within fairly tight tolerances, especially when the plunge mechanism is moved to its extended position. Otherwise, the plunge mechanism may not be able to adequately engage a data cartridge, or the plunge mechanism may fail to seat a data cartridge in a cartridge receiving device. One method of controlling the position of a plunge mechanism is disclosed in U.S. Pat. No. 6,104,693, entitled "Mounting System for Cartridge Plunge Mechanism", which is hereby incorporated by reference for all that it discloses. The method disclosed therein uses a detector assembly to read a plurality of index marks on an elongate linear reference member. The detector assembly is mounted to the body of a plunge mechanism, and the reference member is mounted to the frame of the cartridge engaging assembly. In this manner, movement of the plunge mechanism causes the detector assembly to pass by the plurality of index marks on the reference member. The position of the plunge mechanism may therefore be controlled, for example, by counting the number of index marks which the plunge mechanism passes, and controlling the drive system for the plunge mechanism in response thereto.

SUMMARY OF THE INVENTION

New methods and apparatus for controlling the position of a plunge mechanism which is mounted to a cartridge engaging assembly are disclosed herein.

In one embodiment, a cartridge engaging assembly comprises a plunge mechanism which is mounted to the cartridge engaging assembly. The plunge mechanism is movable between a retracted position and an extended position. A reference mark is provided on the plunge mechanism so that the reference mark moves with the plunge mechanism. A detector is also mounted to the cartridge engaging assembly. As the plunge mechanism is extended, the detector detects the reference mark and produces an output signal which is related thereto. A control system is operatively associated with the detector and is responsive to the output signal produced thereby. The control system is also operatively associated with the plunge mechanism. As a result, the control system can regulate the position of the plunge mechanism based on the output signal produced by the detector.

In another embodiment, a method for regulating a position of a plunge mechanism which is associated with a cartridge engaging assembly comprises 1) providing a reference mark on the plunge mechanism, 2) detecting a size of the reference mark on the plunge mechanism, and 3) determining the position of the plunge mechanism based on the size of the detected reference mark.

In another embodiment, a method for moving a plunge mechanism to an extended position within a cartridge engaging assembly comprises initiating movement of the plunge mechanism from a retracted toward an extended position in accordance with an open loop control schedule. A detector is monitored to determine when a reference mark provided on the plunge mechanism is detected. Control of the movement of the plunge mechanism is then switched to a closed loop control schedule when the detector detects the reference mark provided on the plunge mechanism.

In yet another embodiment, a method for moving a plunge mechanism to an extended position within a cartridge engaging assembly comprises initiating movement of the plunge mechanism from a retracted toward an extended position in accordance with an open loop control schedule. After the plunge mechanism is moved for a predetermined distance, control of the movement of the plunge mechanism is switched to a closed loop control schedule, and an output signal of a detector which detects a reference mark provided on the plunge mechanism is monitored.

BRIEF DESCRIPTION OF THE DRAWINGS

Illustrative and presently preferred embodiments of the invention are illustrated in the drawings, in which:

FIGS. 6a & 6b are simplified side elevational views of the cartridge engaging assembly shown in FIG. 2, wherein FIG. 6a shows the assembly's plunge mechanism in its retracted position, and wherein FIG. 6b shows the assembly's plunge mechanism in its extended position;

DESCRIPTION OF THE PREFERRED EMBODIMENT

Figure 1:
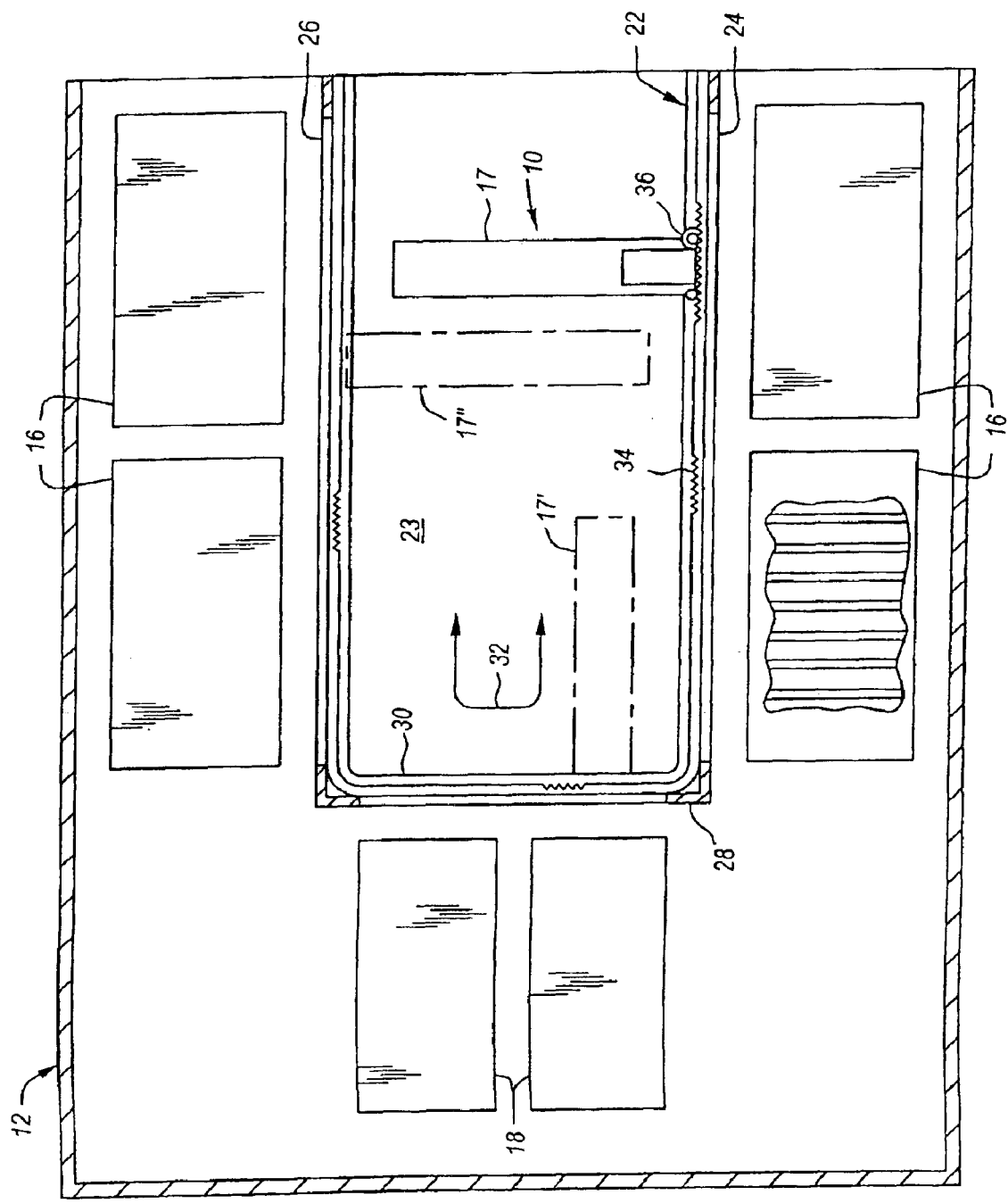
FIG. 1 is a plan view of a cartridge engaging assembly as it may be used in a data storage system to access and transport data cartridges contained within the data storage system.

A cartridge engaging assembly or "picker" 10 is shown in FIG. 1 as it could be used in a "juke box" data storage system 12 to transfer data cartridges 14 between one or more cartridge receiving devices, such as one or more cartridge storage racks or "magazines" 16, and one or more cartridge read/write devices or "drives" 18. The various cartridge receiving devices (e.g., the cartridge storage racks 16 and the cartridge read/write devices 18) may be positioned at various locations within the data storage system 12 so that they define a generally U-shaped configuration, as best seen in FIG. 1. However, the cartridge engaging assembly 10 may be used in any of a wide range of other types of data storage systems. For example, the cartridge engaging assembly 10 may also be utilized in a data storage system of the type shown and described in U.S. Pat. No. 5,596,556, entitled "Linear Displacement and Support Apparatus for use in a Cartridge Handling System", which is hereby incorporated by reference for all that it discloses.

The cartridge engaging assembly 10 is adapted to 1) engage a data cartridge 14 contained in a cartridge receiving device 16, 18, and then 2) draw the data cartridge 14 into the cartridge engaging assembly for transport to a different cartridge receiving device 16, 18. Movement of the cartridge engaging assembly 10 may be achieved via an actuator system 36 which moves the cartridge engaging assembly 10 along a U-shaped path of a cartridge positioning system 22.

Figure 2:
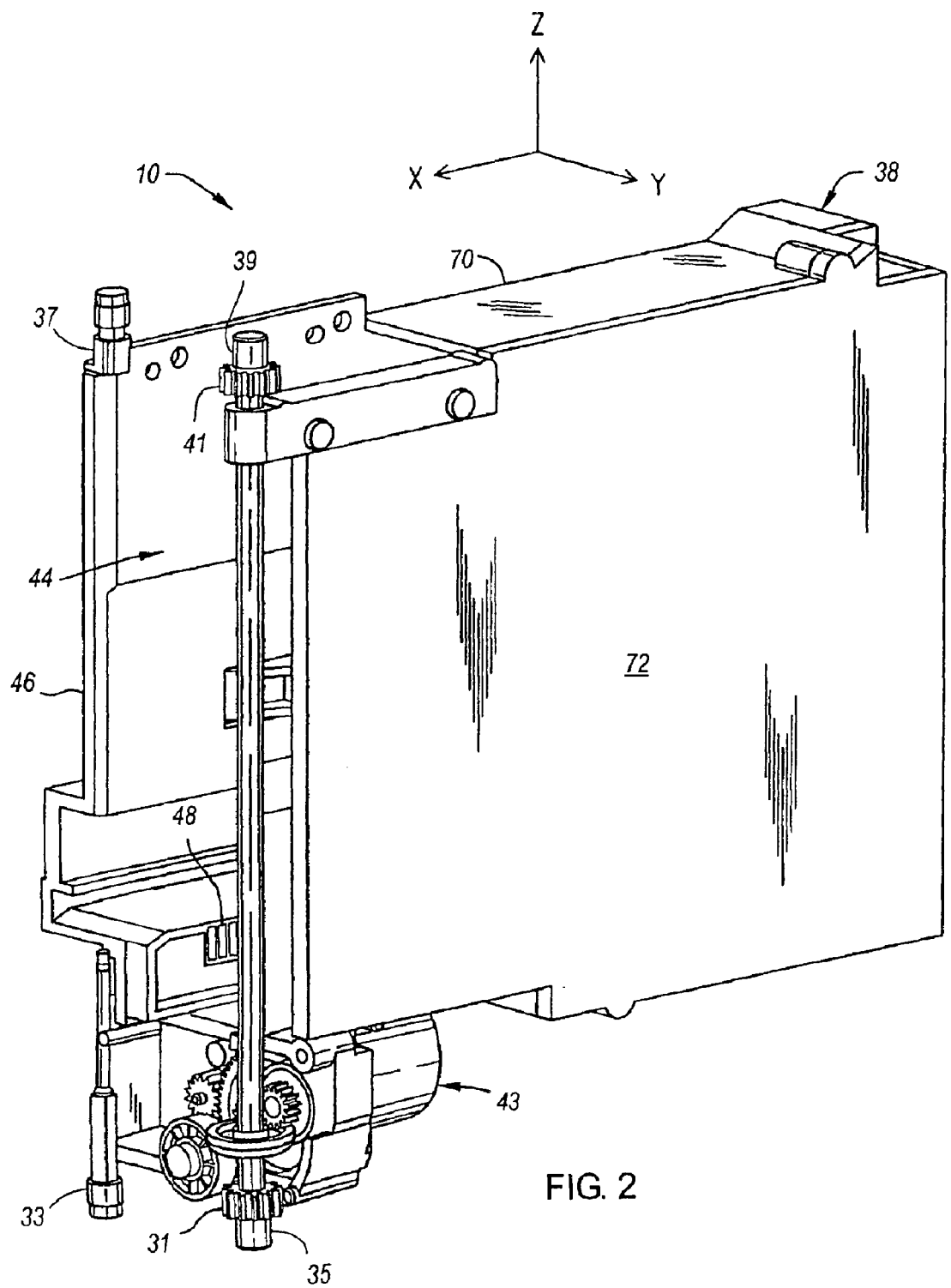
FIG. 2 is a first perspective view of the cartridge engaging assembly shown in FIG. 1.
Figure 3:
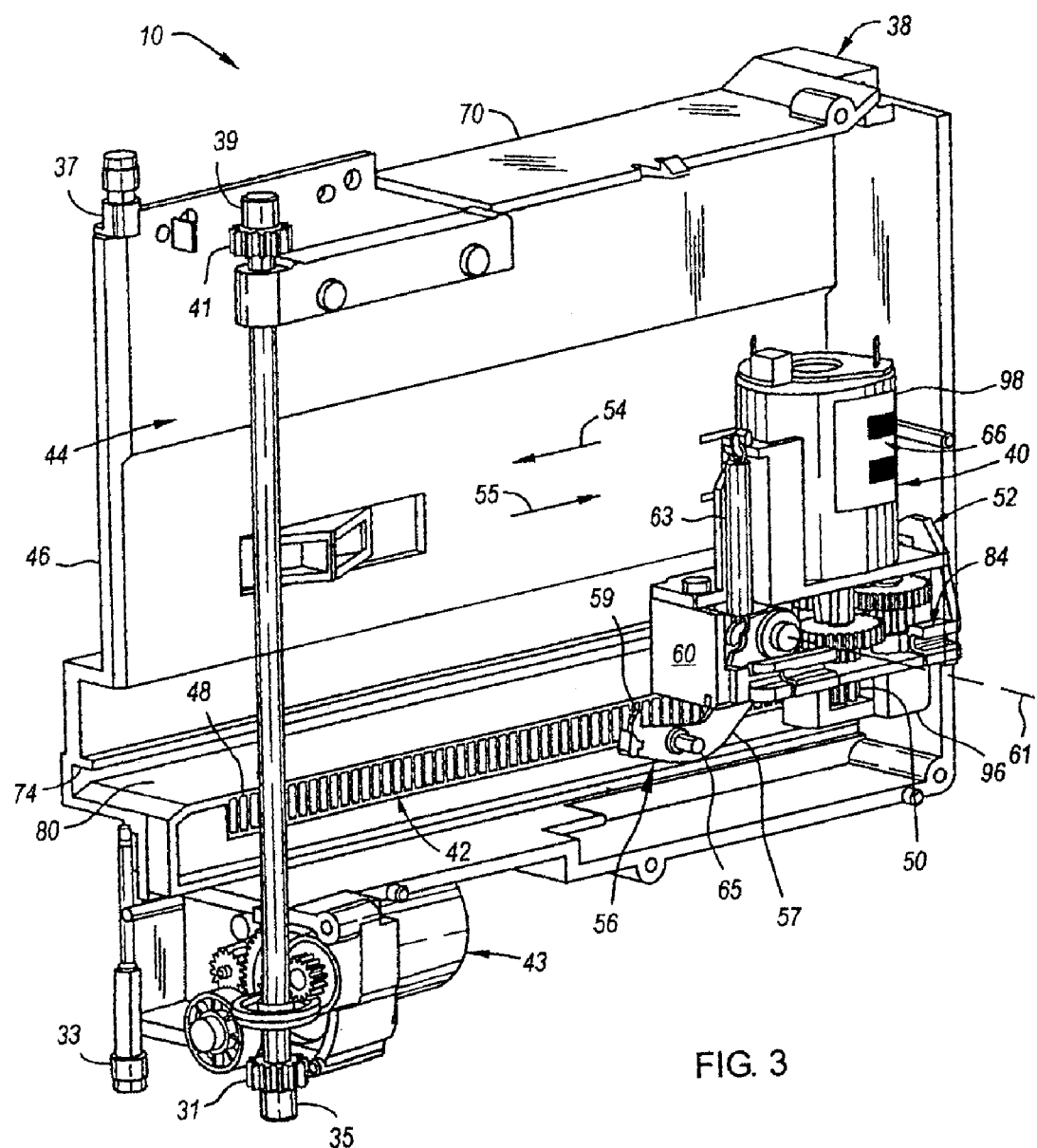
FIG. 3 is a second perspective view of the cartridge engaging assembly shown in FIG. 2, wherein a side member is removed to show the arrangement of a rack and pinion drive system for moving the assembly's plunge mechanism.
Figure 4:
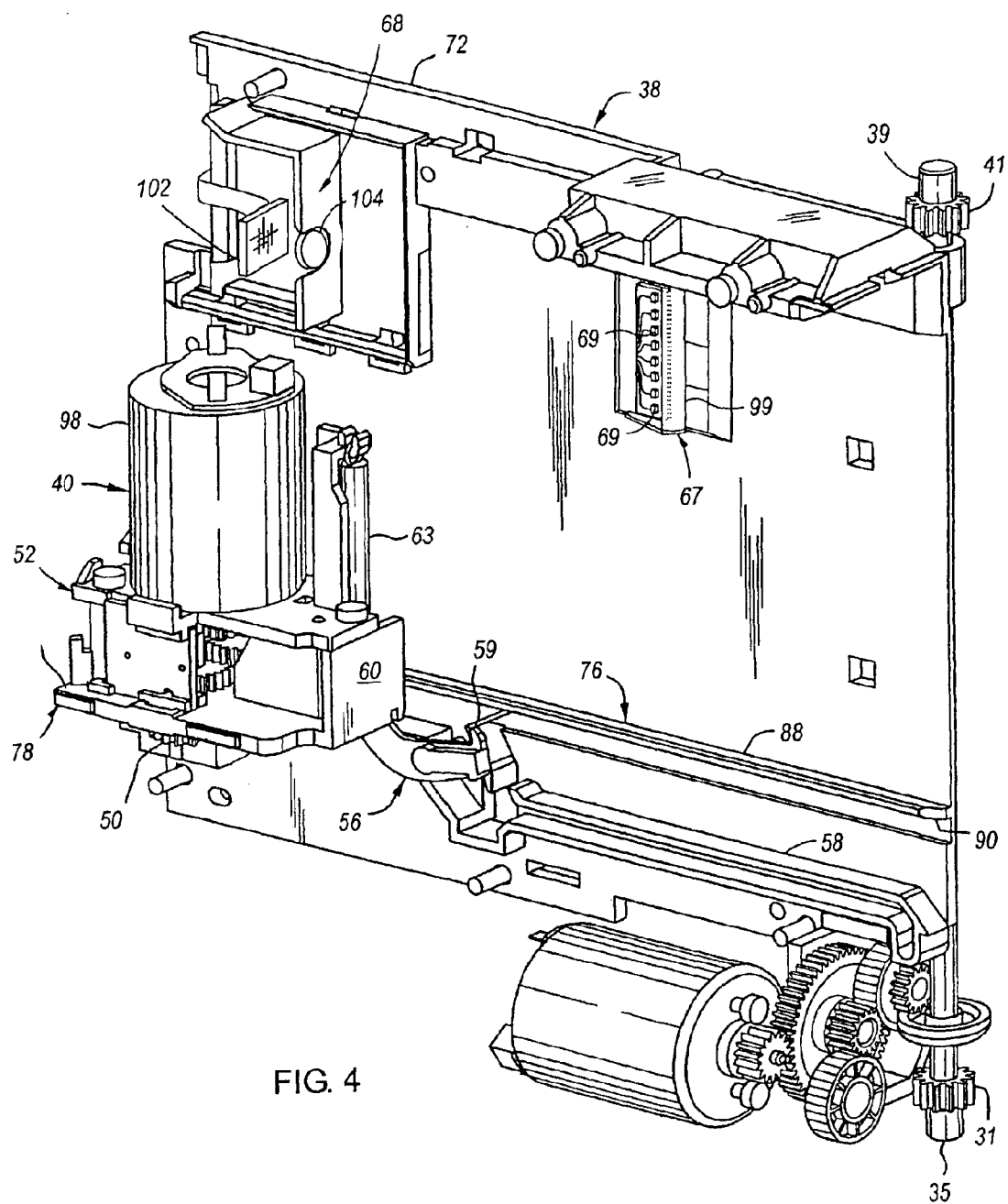
FIG. 4 is a third perspective view of the cartridge engaging assembly shown in FIG. 2, wherein a side member is removed to show the arrangement of a guide track for the assembly's plunge mechanism and finger assembly.

Referring primarily to FIGS. 2–4, the cartridge engaging assembly 10 may comprise a frame assembly 38 that defines a chamber or cavity 44 sized to receive the data cartridge 14. A plunge mechanism or "thumb assembly" 40 is slidably mounted to the frame assembly 38 so that the plunge mechanism 40 may be moved toward and away from the cartridge access end 46 of the frame assembly 38, generally in the directions indicated by arrows 54 and 55, respectively (FIG. 3). More specifically, the plunge mechanism 40 may be moved between a retracted position (shown in FIGS. 3–5 and 6(a)) and an extended position (shown in FIG. 6(b)).

In one preferred embodiment, the mounting system used to slidably mount the plunge mechanism 40 to the frame assembly 38 comprises a first guide rail 79 positioned on a first side member 70 of the frame assembly 38, and a second guide rail 76 positioned on a second side member 72 of the frame assembly 38 (FIGS. 3 and 4). The first guide rail 79 comprises a first horizontal surface 80, and the second guide rail 76 comprises a second horizontal surface 88. The plunge mechanism 40 comprises a first flange member 78 for slidably engaging the first horizontal surface 80 of the first guide rail 79, and a second, C-shaped flange member 84 for slidably engaging the second horizontal surface 88 of the second guide rail 76. The mounting system guides the plunge mechanism 40 along a horizontal plane and allows it to be moved toward and away from the cartridge access end 46 of the frame assembly 38, generally in the directions of arrows 54 and 55, respectively.

A rack and pinion drive assembly 42 is used to move the plunge mechanism 40 back and forth between its retracted position and the extended position. Essentially, the rack and pinion drive assembly 42 may comprise a gear rack 48 mounted to the first side member 70 of the frame assembly 38, and a pinion gear 50 mounted to the plunge mechanism 40. The pinion gear 50 is mounted to the plunge mechanism 40 so that the pinion gear 50 engages the gear rack 48, as best seen in FIGS. 3, 6(*a*) and 6(*b*). A drive system 52 connected to the pinion gear 50 rotates the pinion gear 50 to move the plunge mechanism 40 toward and away from the cartridge access end 46 of the frame assembly 38 (i.e., generally in the directions indicated by arrows 54 and 55, respectively).

Figure 7:
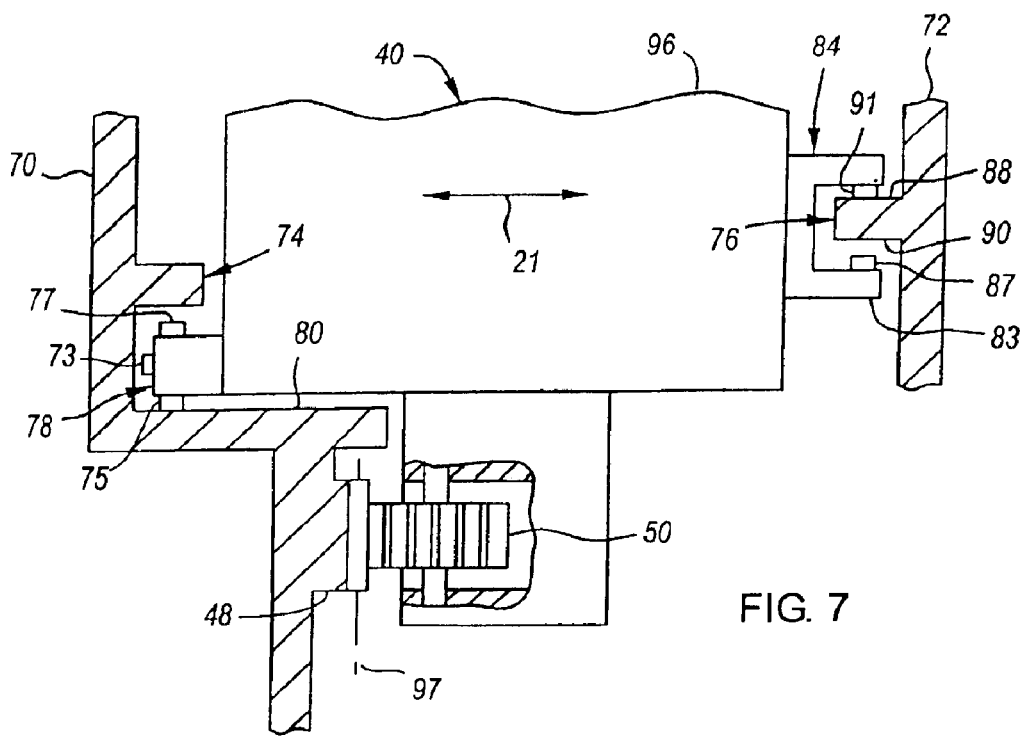
FIG. 7 is an enlarged cross-sectional, elevational view of the FIG. 2 plunge mechanism and its guide rail assembly, wherein the engagement of the bearing members of first and second flange members with various guide rails is more clearly shown.

The engagement of the pinion gear 50 with the gear rack 48 defines a vertical guide surface or plane 97, as best seen in FIG. 7. This vertical guide surface or plane 97, together with the second or C-shaped flange member 84 on the plunge mechanism 40 and the second side member 72, limits the side-to-side movement (indicated by arrows 21) of the plunge mechanism 40.

Figure 6A:
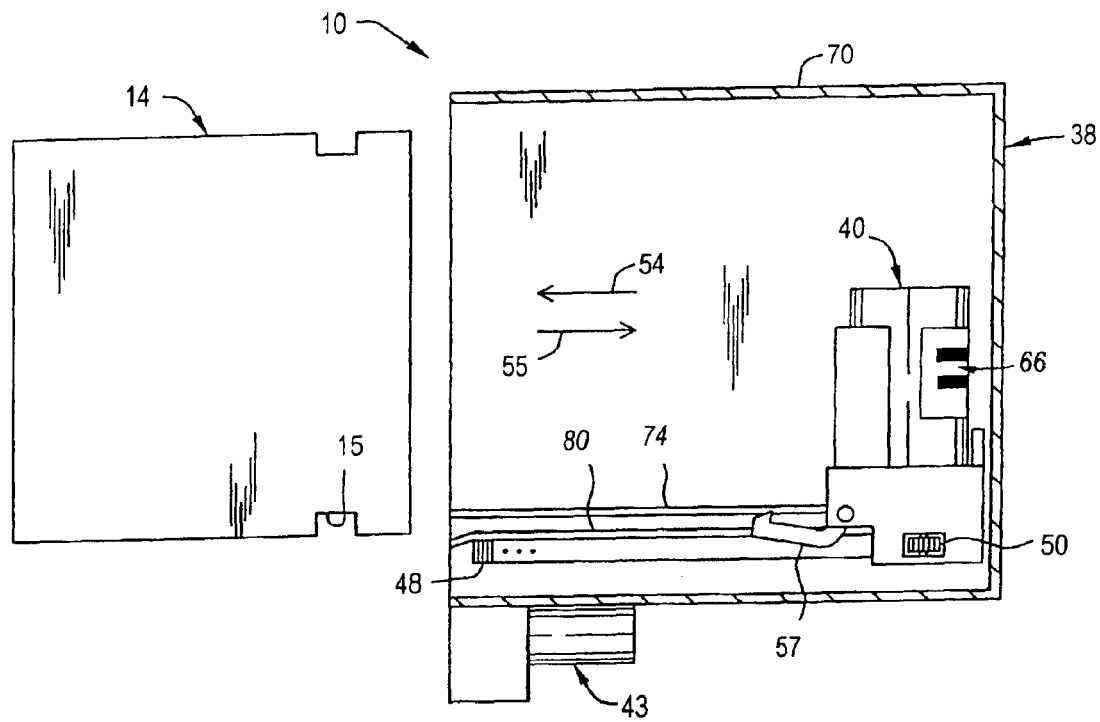
Figure 6B:
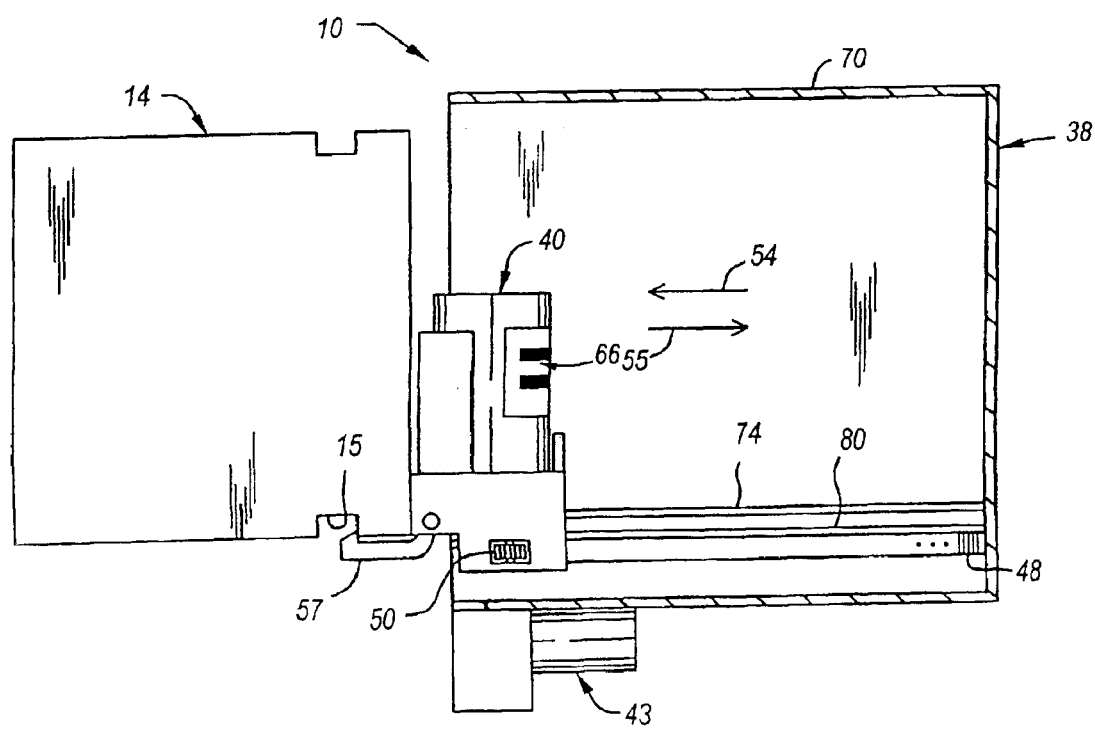

The plunge mechanism 40 may also be provided with a finger assembly 56 which is configured to engage a notch 15 or other similar feature provided on a data cartridge 14, as best seen in FIG. 6*b*. The finger assembly 56 allows the plunge mechanism 40 to engage and withdraw a data cartridge 14 from a cartridge receiving device 16, 18. In one preferred embodiment, the finger assembly 56 is actuated by a guide track 58 in the frame assembly 38, as best seen in FIG. 4.

The cartridge engaging assembly 10 may also be provided with a position control system 62 for providing an output signal from which information may be derived about the position of the plunge mechanism 40 in the frame assembly 38. The position control system 62 comprises a reference mark 66 which is applied to the plunge mechanism 40 so that it moves with the plunge mechanism 40 (see FIGS. 5, 6(*a*) and 6(*b*)). A detector 68 mounted to the frame assembly 38 detects the reference mark 66 on the plunge mechanism 40 and produces an output signal which is indicative of the size of the reference mark 66. The size of the reference mark may then be used by a picker control system 64 to determine the position of the plunge mechanism 40. The picker control system 64 may then control the drive system 52 to precisely move the plunge mechanism 40 to a desired position.

The cartridge engaging assembly 10 may be operated as follows to retrieve a data cartridge 14 from a selected cartridge receiving device (e.g., either the cartridge storage rack 16 or the cartridge read/write device 18, as the case may be). Assuming that the cartridge positioning system 22 (FIG. 1) has positioned the cartridge engaging assembly 10 adjacent the selected data cartridge 14, the picker control system 64 may actuate the drive system 52 to rotate the pinion gear 50 so as to move the plunge mechanism 40 toward the cartridge access end 46 of the frame assembly 38. That is, the drive system 52 moves the plunge mechanism 40 in the direction of arrow 54. As the plunge mechanism 40 approaches the data cartridge 14, the finger assembly 56 engages the notch 15 or other similar feature on the data cartridge 14 (FIG. 6(*b*)). By detecting the reference mark 66 as the plunge mechanism 40 approaches the data cartridge 14, the position control system 62 may be used to precisely position the plunge mechanism 40 via the drive system 52. The arrangement of the plunge mechanism 40 and finger assembly 56 is such that the finger assembly 56 engages the notch 15 on the data cartridge 14 when the plunge mechanism 40 is at or near its fully extended position. This condition is illustrated in FIG. 6*b*. After the data cartridge 14 has been engaged by the finger assembly 56, the picker control system 64 may operate the drive system 52 to reverse the direction of rotation of the pinion gear 50. This causes the plunge mechanism 40, along with the engaged cartridge 14, to move in the opposite direction (i.e., in the direction of arrow 55 (FIG. 3)), thereby retracting the plunge mechanism 40 and data cartridge 14 into the cavity 44 defined by the frame assembly 38. The drive system 52 continues to retract the plunge mechanism 40 and engaged data cartridge 14 until the data cartridge 14 is drawn into the cavity 44 of the frame assembly 38 by an amount sufficient to allow the positioning system 22 (FIG. 1) to move the cartridge engaging assembly 10 to another location. The positioning system 22 may thereafter move the cartridge engaging assembly 10 to a new location.

Once the cartridge engaging assembly 10 has been properly positioned adjacent the new location, the picker control system 64 may again actuate the drive system 52 to move (i.e., extend) the plunge mechanism 40 in the direction of arrow 54. As the plunge mechanism 40 moves toward the cartridge access end 46 of the frame assembly 38, surface 60 pushes against the data cartridge 14, thereby pushing the data cartridge 14 into the selected cartridge receiving device (e.g., the cartridge storage rack 16 or the cartridge read/write device 18, as the case may be). At the same time, the guide track 58 actuates the finger assembly 56 to disengage the finger assembly 56 from the notch 15 provided in the data cartridge 14. If the plunge mechanism 40 is appropriately extended, the data cartridge 14 will be inserted fully into a cartridge receiving device 16, 18 so that it properly "seats" in the cartridge receiving device 14, 18. Appropriate extension of the plunge mechanism 40 is once again controlled by the position control system 62. After insertion of the data cartridge 14 into a cartridge receiving device 16, 18, the picker control system 64 may actuate the drive system 52 once again, to thereby retract the plunge mechanism 40 back into the cartridge engaging assembly 10. The cartridge engaging assembly 20 is then ready to withdraw another data cartridge 14 and transport it to a new location.

Having briefly described the cartridge engaging assembly 10, as well as some of its more significant features and advantages, the cartridge engaging assembly 10 will now be described in detail. However, before proceeding with the description, it should be noted that the cartridge engaging assembly 10 may be utilized in any of a wide range of data storage systems now known in the art, or that may be developed in the future, for storing and accessing one or more data cartridges. Accordingly, the present invention should not be regarded as being limited to the particular data storage system 12 shown and described herein. It should also be noted that while the cartridge engaging assembly 10 is shown and described herein as it could be used to store and retrieve a DLT (digital linear tape) data cartridge 14 having a standard size and configuration, it is not limited to any particular type or style of data cartridge. Indeed, the cartridge engaging assembly 10 could be used with any type of data storage device comprising any type of data storage medium (e.g., LTO cartridges, magnetic discs or tapes, optical discs, etc.). Consequently, the cartridge engaging assembly 10 should not be regarded as limited to use with the DLT type of data cartridge 14 shown and described herein.

With the foregoing considerations in mind, one embodiment of a cartridge engaging assembly or "picker" 10 is shown in FIG. 1 as it could be used in a "juke box" data storage system 12 to transfer data cartridges 14 between one or more cartridge receiving devices, such as one or more cartridge storage racks or "magazines" 16, and one or more cartridge read/write devices or "drives" 18. The various cartridge receiving devices (e.g., the cartridge storage racks 16 and the cartridge read/write devices 18) may be positioned at various locations within the data storage system 12 so that they define a generally U-shaped configuration, as best seen in FIG. 1, although other arrangements are possible. By way of example, the cartridge engaging assembly 10 may be utilized in a data storage system of the type shown and described in U.S. Pat. No. 6,025,972, entitled "Multi-Plane Translating Cartridge Handling System", which is hereby incorporated by reference for all that it discloses. Alternatively, the cartridge engaging assembly 10 may be utilized in a data storage system of the type shown and described in U.S. Pat. No. 5,596,556 (referred to supra).

The cartridge engaging assembly 10 is adapted to 1) engage a data cartridge 14 contained in a cartridge receiving device 16, 18, and then 2) draw the data cartridge 14 into the cartridge engaging assembly for transport to a different cartridge receiving device 16, 18. Movement of the cartridge engaging assembly 10 may be achieved, in part, via an actuator system 36 which moves the cartridge engaging assembly 10 along a U-shaped path of a cartridge positioning system 22.

By way of example, the cartridge positioning system 22 may be of the type shown and described in U.S. Pat. No. 6,025,972 (referred to supra). The cartridge positioning system 22 disclosed therein may comprise a generally rectangularly shaped structure having a pair of opposed side portions 24 and 26 and an end portion 28. A pair of cartridge storage racks 16 may be positioned adjacent the two opposed sides 24 and 26 of the cartridge positioning system 22. Similarly, a pair of cartridge read/write devices 18 may be positioned adjacent the end 28 of the cartridge positioning system 22.

The cartridge positioning system 22 may also comprise a lower plate 23 having a U-shaped guide member or channel 30 formed therein for guiding the cartridge engaging assembly 10 along a generally U-shaped path 32 so that the cartridge engaging assembly 20 may access the data cartridges 14 contained in the various cartridge storage racks 16 and cartridge read/write devices 18.

As previously stated, the cartridge engaging assembly 10 may be moved along the U-shaped guide member 30 by an actuator system 36. For example, the actuator system 36 may move the cartridge engaging assembly 10 between a first position 17 adjacent the first side portion 24 of the positioning system 22, a second position 17' adjacent the end portion 28 of the positioning system 22, and a third position 17" adjacent the second side portion 26 of the positioning system 22 (i.e., the cartridge engaging assembly 10 may be moved along the generally U-shaped path 32).

The actuator system 36 may comprise a rack and pinion drive system having a U-shaped gear rack 34 mounted adjacent the U-shaped guide member 30 in the lower plate 23. A lower pinion gear 31 may be mounted to the cartridge engaging assembly 10 so that it engages the U-shaped gear rack 34. A pair of lower bearing members 33, 35 mounted to the cartridge engaging assembly 10 may be configured to be received by the U-shaped guide member 30. The cartridge engaging assembly 10 may also be provided with a pair of upper bearing members 37, 39 and an upper pinion gear 41 which engage an upper U-shaped guide member (not shown) and an upper U-shaped gear rack (not shown) provided on an upper plate (not shown) associated with the cartridge positioning system 22. A drive pinion actuator system 43 may then be used to drive the lower and upper pinion gears 31, 41 to thereby move the cartridge engaging assembly 10 along the U-shaped path 32.

The foregoing description of the data storage system 12 and cartridge positioning system 22 is provided in order to better understand one environment in which the cartridge engaging assembly 10 may be used. However, it should be understood that the cartridge engaging assembly 10 may be used in any of a wide range of other types of data storage systems, and in conjunction with any of a wide range of cartridge positioning systems now known or that may be developed in the future. Consequently, the cartridge engaging assembly 10 should not be regarded as being limited to use with the particular data storage system 12 and cartridge positioning systems 22 shown and described herein. Also, since detailed descriptions of the data storage system 12 and cartridge positioning system 22 are not required to understand or practice the cartridge engaging assembly 10, the particular data storage system 12 and cartridge positioning system 22 that may be used in conjunction with the cartridge engaging assembly 10 will not be described in further detail herein.

Figure 5:
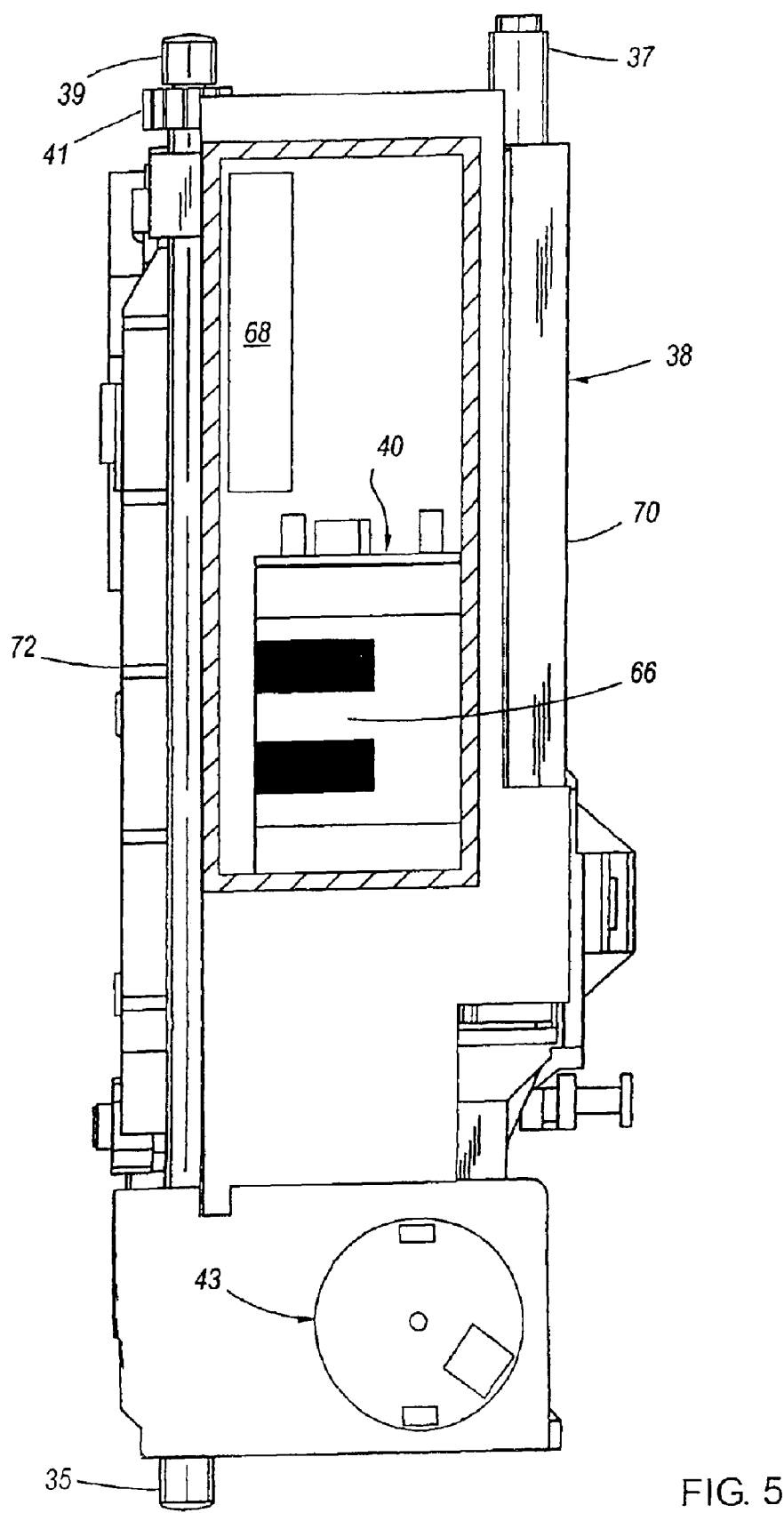
FIG. 5 is a simplified rear elevational view of the cartridge engaging assembly shown in FIG. 2, wherein the assembly's frame is broken away to reveal the rear of the assembly's plunge mechanism.

The details of one embodiment of the cartridge engaging assembly 10 are best seen in FIGS. 3–5. Essentially, the cartridge engaging assembly 10 may include a frame assembly 38 having a first side member 70 and a second side member 72. The two side members 70, 72 of the frame assembly 38 define a chamber or cavity 44 of sufficient size to receive a data cartridge 14. The plunge mechanism 40 is slidably mounted to the frame assembly 38 so that the plunge mechanism 40 may be moved toward and away from the cartridge access end 46 of the frame assembly 38, generally in the directions of arrows 54 and 55, respectively (FIG. 3). More specifically, the plunge mechanism 40 is slidably mounted to the frame assembly 38 so that the plunge mechanism 40 can be moved between a retracted position (shown in FIGS. 3, 4, and 6(a)) and an extended position (shown in FIG. 6(b)).

In one preferred embodiment, the plunge mechanism 40 may be mounted on first and second elongate guide rails 79 and 76 that are respectively provided on the first and second sides 70, 72 of the frame assembly 38. The first elongate guide rail 79 includes a first horizontal guide surface 80, whereas the second elongate guide rail 76 includes a second horizontal guide surface 88. In one preferred embodiment, the first and second horizontal guide surfaces 80, 88 are non-coplanar, as best seen in FIG. 7. Alternatively, the first and second horizontal guide surfaces 80, 88 may be coplanar. In any event, the main body portion 96 of the plunge mechanism 40 may include a first flange member 78 which is sized and positioned to engage the first horizontal guide surface 80 of the first elongate guide rail 79. The main body portion 96 of the plunge mechanism 40 may also include a second or C-shaped flange member 84 which is adapted to engage the second horizontal guide surface 88 of the second elongate guide rail 76.

Figure 8:
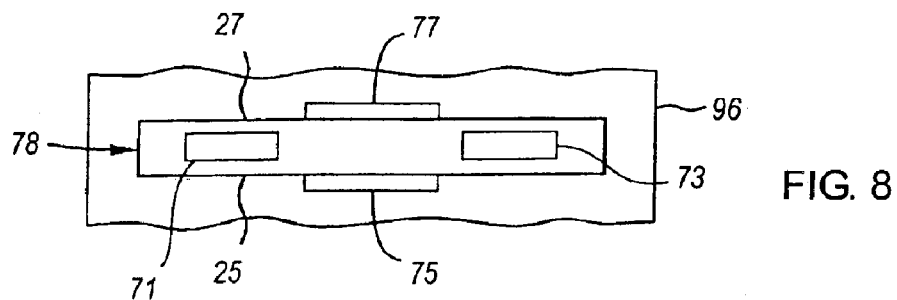
FIG. 8 is an enlarged side view of the first flange member of the FIG. 2 plunge mechanism.

Referring now primarily to FIGS. 7 and 8, the first flange member 78 may comprise a generally rectangularly shaped member having a bottom surface 25 and a top surface 27. A first or lower bearing member 75 is provided on the bottom surface 25 of the first flange member 78 so that it may contact the first horizontal guide surface 80, as best seen in FIG. 7. The top surface 27 of the flange member 78 may be provided with an upper bearing member 77. The upper bearing member 77 is positioned so that it may contact a horizontal capture rail 74. The first flange member 78 may also be provided with a pair of vertical bearing members 71, 73 which are positioned so that they may contact the first side member 70. However, as will be explained in greater detail below, the upper bearing member 77 and pair of vertical bearing members 71, 73 do not normally contact their respective adjacent surfaces.

Figure 9:
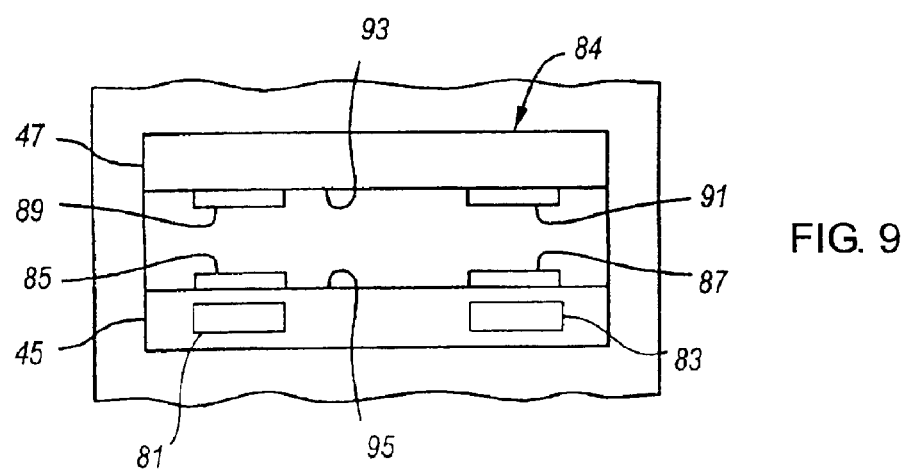
FIG. 9 is an enlarged side view of the second, C-shaped flange member of the FIG. 2 plunge mechanism.

The second flange member 84 may comprise a substantially C-shaped member and is best seen in FIGS. 7 and 9. Essentially, the second flange member 84 comprises a lower horizontal member 45 and an upper horizontal member 47. The bottom facing surface 93 of the upper horizontal member 47 may be provided with a pair of bearing members 89, 91 which are positioned in spaced-apart relation. The pair of bearing members 89, 91 contact the second horizontal surface 88 on the second guide rail 76, as best seen in FIG. 7. Additionally, the lower horizontal member 45 may be provided with a plurality of bearing members. More specifically, the lower horizontal member 45 may be provided with a pair of vertical bearing members 81, 83 which are positioned so that they may contact the second side member 72. The upper facing surface 95 of the lower horizontal member 45 may be provided with a pair of bearing members 85, 87 which are positioned so that they may contact the bottom surface 90 of the second guide rail 76. The various bearing members 81, 83, 85, 87 which are provided on the lower horizontal member 45 do not normally contact their respective adjacent surfaces.

In accordance with the structural arrangement described above, the plunge mechanism 40 is supported on one side by the bearing member 75 that contacts the first horizontal surface 80, and on the other side by the bearing members 89, 91 that contact the second horizontal surface 88. The three bearing members 75, 89, 91 allow the plunge mechanism 40 to be moved along a defined horizontal plane (not shown), even though the bearing members 75, 89, 91 themselves may be non-coplanar.

The side-to-side movement of the plunge mechanism 40 (e.g., movement in the directions indicated by arrows 21 (FIG. 7)) is limited by a combination of the engagement of the pinion gear 50 and gear rack 48 on the one side, and on the other side by the pair of vertical bearing members 81, 83 and the second side member 72. More specifically, the engagement of the pinion gear 50 and the gear rack 48 defines a vertical guide surface or plane 97 which limits the maximum leftward (looking at FIG. 7) movement of the plunge mechanism 40. The maximum rightward movement of the plunge mechanism 40 is limited by the pair of vertical bearing members 81 and 83 contacting the second side member 72, wherein the second side member 72 defines a second vertical guide surface or plane. As will be described in greater detail below, it is generally preferred that spaces or gaps be provided between the pair of vertical bearing members 81, 83 and the side member 72 to prevent binding of the pinion gear 50 and gear rack 48 (FIG. 7).

Recognizing that the pinion gear 50 and gear rack 48 will wear with use, the first flange member 78 may be provided with the pair of vertical bearing members 71, 73 which may eventually contact the first side member 70. The pair of vertical bearing members 71, 73 thereby limit the maximum leftward movement of the plunge mechanism 40 even if the pinion gear 50 and gear rack 48 experience excessive wear. Put another way, the maximum side-to-side movement (arrows 21) of the plunge mechanism 40 generally will not exceed the sum of the spaces or gaps provided between the pair of vertical bearing members 71, 73 and the first side member 71 on the one side of plunge mechanism 40, and the pair of vertical bearing members 81, 83 and the second side member 72 on the other side of plunge mechanism 40.

The various spaces or gaps provided between the first pair of vertical bearing members 71, 73 and the first side member 71, and provided between the second pair of vertical bearing members 81, 83 and the second side member 72, may comprise any of a wide range of sizes depending on the amount of horizontal positioning accuracy that is to be provided for the plunge mechanism 40. In one preferred embodiment, the spaces or gaps provided between the vertical bearing members 71, 73 and the first side member 70 may be in the range of about 0.10 mm to 0.60 mm (0.35 mm preferred). Similarly, the spaces or gaps provided between the second pair of vertical bearing members 81, 83 and the second side member 72 may be in the range of about 0.01 mm to 0.61 mm (0.3 mm preferred).

In one preferred embodiment, the first side member 70 may also be provided with the capture rail 74 to prevent excessive upward vertical movement of the first flange member 78. Excessive upward vertical movement of the second or C-shaped flange member 84 is provided by the lower surface 90 of the second guide rail 76.

The bearing member 77 on the first flange member 78, and the bearing members 85, 87 on the lower horizontal member 45 of the second flange member 84, will contact the capture rail 74 and lower surface 90 of the second guide rail 76, respectively, should the condition develop wherein the plunge mechanism 40 is urged upward.

It is generally preferred that spaces or gaps be provided between the bearing member 77 and the capture rail 74 on the one side of the plunge mechanism 40, and the bearing members 85, 87 and the lower surface 90 of the second guide rail 76 on the other side of the plunge mechanism 40. The various spaces or gaps may comprise any of a wide range of sizes depending on the amount of vertical positioning accuracy that is to be provided for the plunge mechanism 40. In one preferred embodiment, the spaces or gaps provided between the bearing members 77 and the capture rail 74 may be in the range of about 0.05 mm to 0.45 mm (0.25 mm preferred). Similarly, the spaces or gaps provided between the bearing members 85, 87 and the lower surface 90 of the second guide rail 76 may be in the range of about 0.05 mm to 0.45 mm (0.25 mm preferred).

The various components of the mounting system just described may be made from any of a wide range of materials which are suitable for an intended application. For example, in one preferred embodiment, the first and second side members 70, 72 of the frame assembly 38 are molded from polycarbonate plastic, although other materials may also be used. It is preferred, but not required, that the various guide rails (e.g., the first and second guide rails 79, 76, as well as the capture rail 74) associated with the first and second side members 70, 72 be provided as integral components thereof, thus eliminating the need to separately attach and align these components to the two side members 70, 72. For example, in one preferred embodiment wherein both of the side members 70, 72 are molded from polycarbonate plastic, the first guide rail 79, second guide rail 76, and capture rail 74 are molded into the first and second side members 70, 72 of the frame assembly 38, as best seen in FIGS. 3 and 4.

The main body portion 96 of the plunge mechanism 40 may also be made from any of a wide range of materials which are suitable for an intended application, such as metals or plastics. For example, in one preferred embodiment, the main body portion 96 of the plunge mechanism 40 is molded from nylon, although other materials could also be used. The various bearing members 71, 73, 75, etc. provided on the first and second flange members 78, 84 of the main body 96 of the plunge mechanism 40 may comprise integral portions of the respective flange members 78, 84. Alternatively, the various bearing members 71, 73, 75, etc. may be provided as separate components which are fixedly attached to the first and second flange members 78, 84 at appropriate positions. If so, the various bearing members 71, 73, 75, etc. may be fabricated from any of a wide range of materials (such as Teflon.RTM.) which are suitable for providing a low friction engagement with the various surfaces of the various guide rails.

As mentioned above, the plunge mechanism 40 is moved between its retracted and extended positions by a rack and pinion drive assembly 42, as best seen in FIG. 3. Essentially, the rack and pinion drive assembly 42 comprises an elongate gear rack 48 that is affixed to the first side member 70 of the frame assembly 38 at a convenient position. For example, in one preferred embodiment, the gear rack 48 is affixed to the first side member 70 at a position which is immediately below the horizontal guide surface 80. Alternatively, the gear rack 48 may be affixed elsewhere on the first side member 70, or to the second side member 72.

The gear rack 48 may be made from any of a wide range of materials which are suitable for an intended application, such as metals or plastics. In the embodiment shown and described herein, wherein the first side member 70 of the frame assembly 38 comprises molded plastic, the gear rack 48 may comprise an integral component of the first side member 70 (i.e., the gear rack 48 comprises a molded portion of the first side member 70). Alternatively, the gear rack 48 may comprise a separate component which is fixedly mounted to the first side member 70.

The main body portion 96 of the plunge mechanism 40 is provided with a pinion gear 50 which is positioned so that it engages the gear rack 48. See FIGS. 3, 6(*a*) and 6(*b*). The pinion gear 50 is caused to rotate by a drive system 52 which, in one preferred embodiment, includes a motor 98 and a gear reduction system 94. The motor 98 may be mounted to the main body portion 96 of the plunge mechanism 40 such that it is operatively associated with the gear reduction system 94. In this manner, the motor 98 rotates the pinion gear 50 to extend and retract the plunge mechanism 40.

The motor 98 may comprise any of a wide range of motors which are suitable for an intended application. In one preferred embodiment, the motor 98 comprises a permanent magnet d.c. motor such as Model No. RS-385PH, available from Mobuchi Corp. of China. However, other motor types may also be used.

The gear reduction system 94 may comprise a conventional gear reduction system which utilizes a plurality of spur gears to provide a reduction ratio sufficient to allow the motor 98 to extend and retract the plunge mechanism 40 at an appropriate speed and with sufficient force to withdraw and insert the data cartridge 14 into a selected cartridge receiving device 16, 18. In one preferred embodiment, the gear reduction system 94 provides a reduction ratio of about 11.5:1, although other ratios may be used depending on the speed and torque characteristics of a particular motor 98. The various spur gears of the gear reduction system 94 may be made from any material which is suitable for an intended application, such as metal or plastic. In one preferred embodiment, the various spur gears of the gear reduction system 94 are made from brass and stainless steel. Alternatively, the gear reduction system 94 could utilize other types of gears to provide the desired reduction, such as worm gears.

The plunge mechanism 40 may also be provided with any of a wide variety of finger assemblies which are well-known in the art for engaging data cartridges such as data cartridge 14. Accordingly, the finger assembly should not be regarded as limited to any particular type of finger assembly. By way of example, in one preferred embodiment, the finger assembly 56 may comprise an arm 57 having a hook portion 59. The hook portion 59 of the arm 57 is configured to engage a notch 15 (FIGS. 6(*a*), 6(*b*)) which is provided on a data cartridge 14. The arm 57 is pivotally mounted to the main body 96 of the plunge mechanism 40 so that the arm 57 is free to pivot about a pivot axis 61. A spring 63 biases the arm toward the engaged position shown in FIGS. 3 and 6(*a*). The arm 57 may be provided with a pin 65 which engages the guide track 58 provided on the second side 72 of the frame assembly 38 (FIG. 4). The guide track 58 actuates the arm 57 as the plunge mechanism 40 moves back and forth between its retracted position (FIGS. 3, 4 & 6(*a*)) and its extended position (FIG. 6(*b*)).

However, since finger and track systems for engaging data cartridges 14 are well-known in the art and could be easily provided by persons having ordinary skill in the art after having become familiar with the teachings disclosed herein, the particular finger system 56 and guide track 58 disclosed above will not be described in greater detail herein.

The cartridge engaging assembly 10 may also be provided with a position control system 62 for providing an output signal from which information may be derived about the position of the plunge mechanism 40 in the frame assembly 38. The position control system 62 comprises a reference mark 66 which is applied to the plunge mechanism 40 so that it moves with the plunge mechanism 40. A detector 68 mounted to the frame assembly 38 detects the reference mark 66 on the plunge mechanism 40 and produces an output signal which is indicative of the size of the reference mark 66. The size of the reference mark may then be used by a picker control system 64 to determine the position of the plunge mechanism 40. The picker control system 64 may then control the drive system 52 to precisely move the plunge mechanism 40 to a desired position.

Figure 11:
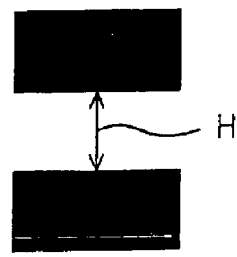
FIG. 11 is a first exemplary embodiment of a reference mark which may be provided on the FIG. 2 plunge mechanism.
Figure 12:
FIG. 12 is a second exemplary embodiment of a reference mark which may be provided on the FIG. 2 plunge mechanism.

The reference mark 66 may comprise any of a wide range of marks. By way of example, the mark 66 in one preferred embodiment may comprise a pair of horizontal bars separated by a gap (i.e., a pair of bars positioned in spaced-apart relation; FIG. 11). However, the reference mark 66 could also consist of a single bar (FIG. 12), or comprise any number of bars. Likewise, the mark could comprise indicia other than bars.

The reference mark 66 may be applied to the plunge mechanism 40 in a number of ways. In a preferred embodiment, the reference mark 66 may be applied to a sticker which, in turn, is applied to the plunge mechanism 40 (FIG. 5). In another embodiment, the reference mark 66 may be formed by a recess or boss on the plunge mechanism 40 (not shown). In yet another embodiment, the reference mark 66 may comprise any identifiable edge, mark, etc. which appears on the plunge mechanism 40 as a result of its manufacture. (Note that the reference mark 66 may be generally referred to in the claims as a "reference means".) The reference mark 66 is preferably constructed and applied to the plunge mechanism 40 such that at a least a portion of the reference mark 66 may be easily and clearly detected by the detector 68.

To enable detection of the reference mark 66 by the detector 68, a light source 67 may need to illuminate the reference mark 66. Ideally, the reference mark 66 receives enough illumination from ambient light sources (e.g., through the cartridge access end 46 of the cartridge engaging assembly 10). However, it is envisioned that such is not often the case. A light source 67 may therefore be mounted to the cartridge engaging assembly 10 such that light is projected onto the reference mark 66. In FIG. 4, the light source 67 is mounted on the second side member 72 of the frame assembly 38. However, the light source 67 may be variously mounted, and may, for example, be mounted in either a stationary position (as shown in FIG. 4) or in a location which travels with the plunge mechanism 40 (e.g., a light source might be mounted directly on the plunge mechanism (not shown)). A preferred embodiment of a light source 67 may comprise a plurality of light emitting diodes (LEDs) 69 which emit light through a lens 99.

The detector 68 is mounted to the cartridge engaging assembly 10 such that it is capable of sensing the reference mark 66. One way in which the detector 68 may sense the reference mark 66 is via a charge coupled device (CCD) 102. Depending on where the detector 68 is mounted, the detector 68 may require a lens 104 or lenses for aligning and/or focusing an image of the reference mark 66 onto a device such as the afore-mentioned CCD 102.

In FIG. 4, the detector 68 is mounted on the second side member 72 of the frame assembly 38. Although the detector 68 may be variously mounted, it should be mounted such that travel of the plunge mechanism 40 causes the reference mark 66 to be sensed differently by the detector 68. For example, movement of the plunge mechanism 40 with respect to the detector 68 may cause an image of the reference mark 66 which is sensed by the detector 68 to change in size (i.e., the image is sensed by a varying number of pixels of a CCD 102).

Figure 10:
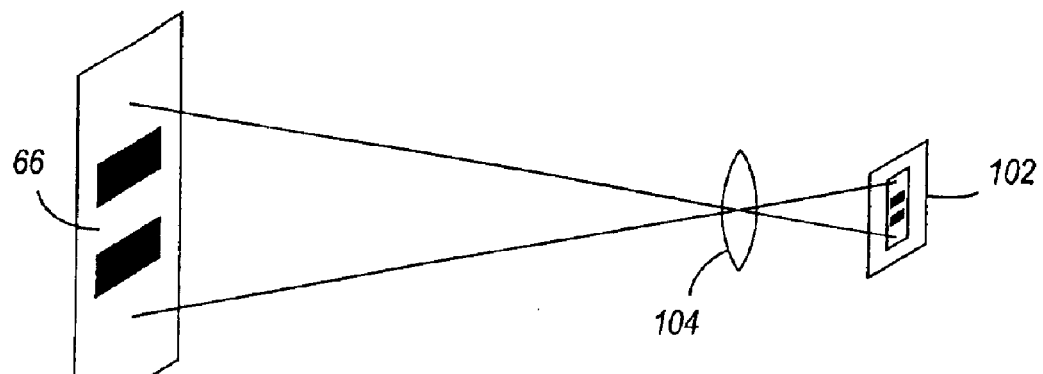
FIG. 10 is an illustration of how the reference mark provided on the FIG. 2 plunge mechanism is detected by a detector.

If the detector 68 comprises a CCD 102 and lens 104 as illustrated in FIG. 4, then the position of the plunge mechanism 40 in the cartridge engaging assembly 10 may be determined as a function of the distance between the lens 104 and the reference mark 66. The distance between the lens 104 and the reference mark 66 may be determined using the following formula (FIG. 10):

$$M = H''/H = S''/S \quad (1)$$

In the above formula, M is the magnification of the lens 104. The quantity H is a known measurement of the reference mark 66 (e.g., the space between the two horizontal bars of the reference mark 66 (FIG. 11)). The quantity H" is a calculable measurement of the image which is sensed by the detector 68 (e.g., the number of pixels representing the space H between the two horizontal bars of the reference mark 66). The quantity S" is the distance between the lens principle point and a predetermined point of the image sensed by the detector 68 (wherein the predetermined point of the image corresponds to a similar point of the reference mark 66). The quantity S is an unknown representing the distance between the lens principle point and a predetermined point on the reference mark 66. Given that all quantities but S are either known or are independently calculable, the unknown S can be computed using the following formula:

$$S = HS''/H'' \quad (2)$$

Once S has been computed, then 1) a known position of the detector 68 with respect to the cartridge engaging assembly 10, and 2) a known position of the reference mark 66 with respect to the plunge mechanism 40, may be used to compute the position of the plunge mechanism 40 with respect to the cartridge engaging assembly 10.

The above computations may be performed by either the detector 68 or the picker control system 64. If the computations are performed by the detector 68, then the detector 68 may generate an output signal which is indicative of the position of the plunge mechanism 40. However, if the computations are performed by the picker control system 64, then the detector 68 may generate an output signal comprising image pixel data. In either case, the picker control system 64 may use the output signal of the detector 68 to derive information about the position of the plunge mechanism 40. The position information may then be used to control operation of the drive system 52, and thus control movement of the plunge mechanism 40 to a desired position.

The detector 68 may comprise any of a wide range of CCD and/or other sensor types that are well-known in the art and readily commercially available. Preferably, the CCD 102 is a linear CCD or bar code reader. As such, the bar code reader can not only be used to detect the reference mark 66, but to also read a bar code label which is applied to a data cartridge 14 located adjacent the cartridge access end 46 of the cartridge engaging assembly 10. A bar code reader for reading bar code labels which are applied to data cartridges 14 is disclosed in U.S. patent application Ser. No. 09/716,878, entitled "Dual Bar Code Reading System for a Data Storage System", which is hereby incorporated by reference for all that it discloses.

Figure 13:
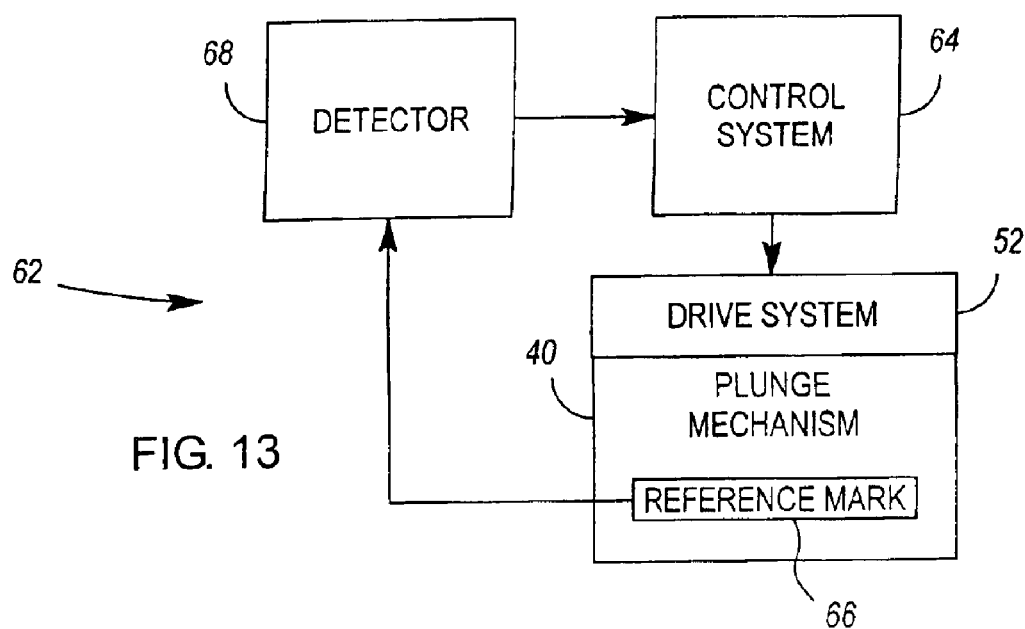
FIG. 13 is a block diagram illustrating a control system's response to the detector and plunge mechanism shown in FIG. 4.

The data storage system 12 may also be provided with a picker control system 64 (FIG. 13) for coordinating the function and operation of the cartridge engaging assembly 10, as well as the function and operation of the cartridge positioning system 22 and actuator system 36. In FIG. 13, the detector 68 is shown to receive the reference mark 66 (i.e., in the form of an image). The detector 68 then generates an output signal which is provided to the control system 64. The control system 64 uses the output signal to determine the position of the plunge mechanism 40. The control system 64 then provides a signal (e.g., a voltage of limited duration) to the plunge mechanism 40 to control movement thereof (i.e., to regulate the position of the plunge mechanism 40). Detection of the reference mark 66 and control of the plunge mechanism's movement continues until the control system 64 determines that a detected size of the reference mark 66 is indicative of the plunge mechanism 40 being in a final and desired position (e.g., an extended position).

Since picker control systems 64 are well-known in the art and could be easily provided by persons having ordinary skill in the art after having become familiar with the teachings disclosed herein, a particular picker control system 64 will not be described in further detail herein.

The cartridge engaging assembly 10 may be operated as follows to retrieve and load a data cartridge 14 from and to a selected cartridge receiving device (e.g., either the cartridge storage rack 14 or the cartridge read/write device 18, as the case may be). Assuming that the cartridge positioning system 22 has positioned the cartridge engaging assembly 10 adjacent a selected data cartridge 14, the picker control system 64 may actuate the drive system 52 to rotate the pinion gear 50 to move the plunge mechanism 40 toward the cartridge access end 46 of the frame assembly 38 (i.e., in the direction of arrow 54). As the plunge mechanism 40 approaches the data cartridge 14, the finger assembly 56 engages a notch 15 or other similar feature on the data cartridge 14 (FIG. 6(b)). By detecting the reference mark 66 as the plunge mechanism 40 approaches the data cartridge 14, the position control system 62 may be used to precisely position the plunge mechanism 40 via the drive system 52. The arrangement of the plunge mechanism 40 and finger assembly 56 is such that the finger assembly 56 engages the notch 15 on the data cartridge 14 when the plunge mechanism 40 is at or near its fully extended position. This condition is illustrated in FIG. 6b. After the data cartridge 14 has been engaged by the hook portion 59 of the finger assembly 56, the picker control system 64 may operate the drive system 52 to reverse the direction of rotation of the pinion gear 50. This causes the plunge mechanism 40, along with the engaged cartridge 14, to move in the opposite direction (i.e., in the direction of arrow 55), thereby retracting the plunge mechanism 40 and data cartridge 14 into the cavity 44 defined by the frame assembly 38. The drive system 52 continues to retract the plunge mechanism 40 and engaged data cartridge 14 until the data cartridge 14 is drawn into the cavity 44 of the frame assembly 38 by an amount sufficient to allow the cartridge positioning system 22 to move the cartridge engaging assembly 10 to another position. The cartridge positioning system 22 may thereafter move the cartridge engaging assembly 10 to a new location.

Once the cartridge engaging assembly 10 has been properly positioned adjacent a new location, the picker control system 64 may again actuate the drive system 52 to move (i.e., extend) the plunge mechanism 40 in the direction of arrow 54. As the plunge mechanism 40 extends, a surface 60 of the plunge mechanism 40 pushes against the data cartridge 14, thereby pushing the data cartridge 14 into a selected cartridge receiving device (e.g., the cartridge storage rack 16 or the cartridge read/write device 18, as the case may be). At the same time, the guide track 58 actuates the finger assembly 56 to disengage the hook portion 59 of the finger assembly 56 from the notch 15 provided in the data cartridge 14. If the plunge mechanism 40 is appropriately extended, the data cartridge 14 will be inserted fully into a cartridge receiving device 16, 18 so that it properly "seats" in the cartridge receiving device 14, 18. Appropriate extension of the plunge mechanism 40 is once again controlled by the position control system 62. Once the plunge mechanism 40 is fully extended, the data cartridge 14 will have been inserted fully into the cartridge receiving device 16, 18. The picker control system 64 may then actuate the drive system 52 to retract the plunge mechanism 40 back into the cartridge engaging assembly 10. The cartridge engaging assembly 10 is then ready to withdraw another data cartridge 14 and transport it to a new location.

During the above cartridge retrieval and loading operations, the position of the plunge mechanism 40 when it is in its extended position is often critical. For example, under- or over-extension of the plunge mechanism 40 during cartridge retrieval can lead to the finger assembly 56 being unable to engage the notch 15 on a data cartridge 14. Likewise, under- or over-extension (and particularly under-extension) can lead to a data cartridge 14 failing to properly seat within a selected cartridge receiving device 16, 18. Such failures to seat can 1) lead to a data cartridge 14 being misread by a cartridge read/write device 18, or 2) lead to a data cartridge 14 becoming dislodged from a cartridge receiving device 16, 18 (e.g., falling out of the cartridge receiving device 16, 18). As a result of these problems, operation of the drive system 52 may be controlled by the picker control system 64, as previously described, to precisely control the position of the plunge mechanism 40.

Preferably, the drive system 52 first moves the plunge mechanism 40 from its retracted position toward its extended position in accordance with an open loop control schedule. Either 1) in response to monitoring the detector 68 to determine when the reference mark 66 is detected, or 2) in response to having moved the plunge mechanism 40 for a predetermined distance, control of the drive system 52 is switched to a closed loop control schedule wherein the plunge mechanism 40 is precisely positioned in response to the detector's output of a signal which is indicative of the position of the plunge mechanism 40. Preferably, the response time of the detector 68 and/or accuracy of the drive system 52 provide for switching the drive system 52 to its closed loop control schedule during the last five millimeters (5 mm) of plunge mechanism plunge. Thus, a relatively small amount of image data needs to be processed by the detector 68 and/or control system 64.

As was previously and briefly discussed, one embodiment of the cartridge engaging assembly 10 uses the detector 68 to fulfill multiple functions. One function is the detection of the reference mark 66. Another function is the reading of bar code labels which are applied to the edges of data cartridges 14 adjacent the cartridge access end 46 of the cartridge engaging assembly 10. When the plunge mechanism 40 is in its retracted position, the light source 67 illuminates the labels on the data cartridges 14. In this manner, prior to retrieving a data cartridge 14, the cartridge engaging assembly 10 may verify or detect which data cartridge 14 it is retrieving. As the plunge mechanism 40 moves to its extended position, the light source 67 begins to illuminate the reference mark 66 which is applied to the plunge mechanism 40. In this manner, the detector 68 can detect the reference mark 66 and provide an output signal to the picker control system 64 for the purpose of precisely positioning the plunge mechanism 40 with respect to a data cartridge 14.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A cartridge engaging assembly, comprising:
   a plunge mechanism that is moveable between a retracted position and an extended position;
   a reference mark, provided on and moving with the plunge mechanism;
   a detector to sense an image of the reference mark and produce an output signal related thereto as the plunge mechanism moves with respect to the detector; and
   a control system that is operatively associated with the detector and responsive to said output signal; said control system also being operatively associated with the plunge mechanism; said control system regulating the position of the plunge mechanism based on the output signal.

2. The cartridge engaging assembly of claim 1, wherein the reference mark comprises a pair of bars positioned in spaced-apart relation.

3. The cartridge engaging assembly of claim 1, wherein the reference mark consists of a single bar.

4. The cartridge engaging assembly of claim 1, wherein the detector comprises a bar code reader, said bar code reader: i) sensing an image of the reference mark, and ii) reading a bar code provided on a cartridge positioned adjacent the cartridge engaging assembly.

* * * * *

UNITED STATES PATENT AND TRADEMARK OFFICE
CERTIFICATE OF CORRECTION

PATENT NO. : 6,925,034 B2  Page 1 of 1
APPLICATION NO. : 10/640219
DATED : August 2, 2005
INVENTOR(S) : Paul C Coffin et al.

It is certified that error appears in the above-identified patent and that said Letters Patent is hereby corrected as shown below:

On the Title page, in field (73), in "Assignee", in column 1, line 2, delete "L.P." and insert -- L.P., Houston, TX (US) --, therefor.

Signed and Sealed this

Fourth Day of August, 2009

JOHN DOLL
*Acting Director of the United States Patent and Trademark Office*